US008662987B2

(12) United States Patent
Bennett et al.

(10) Patent No.: US 8,662,987 B2
(45) Date of Patent: Mar. 4, 2014

(54) GAMING SYSTEM AND A METHOD OF GAMING

(75) Inventors: Nicholas Luke Bennett, Manly Vale (AU); David Villa, Cronulla (AU)

(73) Assignee: Aristocrat Technologies Australia Pty Limited (AU)

( * ) Notice: Subject to any disclaimer, the term of this patent is extended or adjusted under 35 U.S.C. 154(b) by 701 days.

(21) Appl. No.: 12/368,183

(22) Filed: Feb. 9, 2009

(65) Prior Publication Data

US 2009/0253479 A1 Oct. 8, 2009

(30) Foreign Application Priority Data

Feb. 7, 2008 (AU) ................................ 2008900566

(51) Int. Cl.
*A63F 13/10* (2006.01)

(52) U.S. Cl.
USPC ................................ 463/20; 463/22

(58) Field of Classification Search
USPC ................................ 463/16–21
See application file for complete search history.

(56) References Cited

U.S. PATENT DOCUMENTS

| | | | | |
|---|---|---|---|---|
| 7,306,518 | B2 * | 12/2007 | Hughs-Baird et al. | 463/16 |
| 2003/0064797 | A1 | 4/2003 | Jackson et al. | |
| 2004/0147306 | A1 * | 7/2004 | Randall et al. | 463/20 |
| 2007/0259709 | A1 * | 11/2007 | Kelly et al. | 463/20 |
| 2008/0108410 | A1 * | 5/2008 | Baerlocher | 463/20 |

FOREIGN PATENT DOCUMENTS

| | | |
|---|---|---|
| WO | 2006029446 | 3/2006 |

* cited by examiner

*Primary Examiner* — Julio J Maldonado
*Assistant Examiner* — Daniel Shook
(74) *Attorney, Agent, or Firm* — McAndrews, Held & Malloy, Ltd.

(57) ABSTRACT

The present invention relates to a gaming system and to a method of gaming that includes a wheel game. A base game, implemented as a reel game, is arranged to generate as one of its outcomes a feature game in the form of a wheel game. The wheel game has a plurality of outcome indicating parts for indicating outcomes of the wheel game. A plurality of outcomes of the wheel game each resulting in play of a different further feature game. This provides a further level of gaming, in order to maintain player interest.

44 Claims, 12 Drawing Sheets

GAMING SYSTEM AND A METHOD OF GAMING

RELATED APPLICATIONS

This application claims priority to Australian Provisional Patent Application No. 2008900566, having a filing date of Feb. 7, 2008, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

The present invention relates to a gaming system and to a method of gaming, and, particularly, but not exclusively, to a method and system of gaming that includes a wheel game.

BACKGROUND OF THE INVENTION

Games comprising a wheel or representation of a wheel and an indicator which moves relative to the wheel are known. These "wheel games" may be implemented as mechanical wheels, electro-mechanical wheels or generated by electronic displays such as video displays. Each wheel usually comprises a number of segments, each segment representing a particular game outcome.

Gaming systems are known which utilise wheel games as secondary or "feature" games in addition to a "base" game played by the gaming system.

It is also known to provide a gaming system which comprises a game controller which is arranged to randomly display several symbols from a pre-determined set of symbols and to determine a game outcome such as a game win based on the displayed symbols. Such gaming systems may commonly be implemented as a stepper machine provided with reels with each reel carrying several symbols of the set, or a video machine where the selected symbols are displayed as virtual reels on a graphical display device. Outcomes can occur based on symbols appearing on one or more horizontal lines, diagonal lines, or in any other pre-determined way.

It is known in gaming systems to provide reel games as a base game and a wheel game as a feature game generated as an outcome of the base reel game e.g. a particular symbol or symbol selection occurring in the base game may result in generation of a feature game played as a wheel game.

A problem with wheel games is that gaming regulations for some markets, including most Australian markets, require that the odds for wheel games must reflect the odds that a person would expect from viewing the wheel. For example, a wheel with six segments would generally be expected to carry odds of 6:1 for selection of a particular segment. This makes it more difficult to offer large prizes on a wheel because the larger the prize, the more effect it will have on the overall return to the player of the game. To support a large prize, either the chances of the player actually activating the wheel feature have to be very low or the amount of the average wager of the player needs to be high.

An advantage of wheel games is that it has been found that players find them particularly entertaining and are attracted to playing games which involve wheel games. While current wheel games provide users with enjoyment, the need exists for alternative gaming systems in order to maintain and increase player enjoyment.

BRIEF SUMMARY OF THE INVENTION

In accordance with a first aspect, the present invention provides a gaming system, comprising a game controller arranged to control operation of a first game having a plurality of available game outcomes, and a display arranged to display a representation of play of the first game, the representation comprising a selector having a plurality of outcome indicating parts and an indicator, the game controller being arranged to determine a first game outcome for the first game from the plurality of available game outcomes, and control the indicator to indicate the outcome indicating part associated with the first game outcome, at least one of the available first game outcomes being a further feature game, the game controller being arranged to control play of the further feature game to determine a prize to be awarded.

An advantage of at least an embodiment of the invention is that the provision of a further feature game, in addition to the first game, provides a further level of interest to entertain the player. Providing different levels in a gaming system advantageously maintains player interest and entertainment. A further advantage of at least an embodiment of the invention is that the further feature game may enable higher prizes to be awarded than available if just the first game were played on its own, as two levels of selection must be achieved (the further feature game must be selected as an outcome of the first game and then the further feature game needs to be played to determine a prize to be awarded).

In an embodiment, the game controller is arranged to control operation of the further feature game to play a first further feature game, wherein the game controller is arranged to control a further selector having a plurality of available further selector outcomes, at least one of the available further selector outcomes determining a prize to be awarded.

In an embodiment, the game controller is arranged to control the display to display a representation of the further selector, the representation comprising the further selector having a plurality of outcome indicating parts indicating the available further selector outcomes.

In an embodiment, the representation of the further selector is of a die wherein the plurality of outcome indicating parts are represented by faces of the die.

In an embodiment, the game controller is arranged to control the display to represent the die to show a face which represents the further selector outcome determined by the game controller. In an embodiment, the game controller is arranged to control the display to represent the die spinning and settling on the face which represents the further selector outcome.

In an embodiment, to control play of the first further feature game, the game controller is arranged to control operation of a sequence of further selectors, each further selector having a plurality of available outcomes. At least one outcome of each further selector is a "Sequence Continue" outcome which determines whether a subsequent further selector in the sequence is operated. If a Sequence Continue outcome is not achieved, then the next further selector in the sequence of further selectors is not played and the sequence ends. In an embodiment, a prize to be awarded depends upon a number of selectors in the sequence that are played. In an embodiment, the more selectors that are played, the greater the prize.

In an embodiment, the game controller is arranged to control the display to display a representation of each of the further selectors in the sequence of further selectors.

In an embodiment, the representation comprises each of the further selectors having a plurality of outcome indicating parts indicating the available further selector outcomes.

In an embodiment, if a further selector in the sequence is not played, it is not displayed.

In an embodiment, the representation of each further selector in the sequence comprises a display of a die, the outcome indicating parts of each further selector being represented by faces of the respective die representing the further selector.

In an embodiment, the game controller is arranged to control the display to represent each die in the sequence to show a face which represents the further selector outcome determined by the game controller for each further selector in the sequence. In an embodiment, the game controller is arranged to control the display to represent each die in the sequence as spinning and settling to show the face representing the further selector outcome.

In an embodiment, the game controller is arranged to determine the value of a prize to be awarded in dependence on an amount bet by a player. In the embodiment which comprises the further selector or sequence of further selectors, the game controller is arranged to vary the available further selector outcomes in dependence on amount bet.

In an embodiment, the first game is a wheel game and each of the outcome indicating parts is represented as a segment of a wheel.

In an embodiment, the first game may be generated as a feature game in response to an outcome of a base game. The base game, may, for example, be a reel game, where the game controller is arranged to randomly select and display several symbols from a predetermined set of symbols and to determine a game outcome such as a game win based on the selected symbols. In this embodiment, at least one game outcome is a trigger for a feature game which results in the first game being played.

In an embodiment the further feature game is a second further feature game in which the game controller is arranged to control play of a reel game and select one or more symbols from the plurality of available symbols. In an embodiment there may be a plurality of reels and one or more of the plurality of reels may be held and the other reels spun. An outcome is determined at the end of the reel spin, which may be based on any combination of available symbols. In one embodiment, the reel or reels may be spun a plurality of times during the second further feature game.

In an embodiment where the first game is generated as a result of an outcome of a base game which is a reel game, during play of the second further feature game, the reel or reels of the base game which resulted in generation of the first game (e.g. a combination of symbols on the reels which resulted in the game controller generating the feature game) are held and the other reel or reels is spun to implement the second further feature game.

In an embodiment, the further feature game is a third further feature game, in which the game controller is arranged to control play by controlling selection of a plurality of symbols from a set of symbols. The game controller is arranged to determine an outcome of the third further feature game based on the selected symbols.

In an embodiment, the third further feature game is represented on the display as a reel game, the selected symbols being represented as appearing on virtual reels, or appearing on physical reels.

In an embodiment, the third further feature game may comprise a different reel game with different symbols than a base game. In an alternative embodiment, the third further feature game may be played using the same reels, symbols and symbol combinations as the base game.

In an embodiment, the game controller is arranged to select a multiplier for the third further feature game. A prize awarded as an outcome of the selected symbols of the third further feature game, is multiplied by the multiplier. In an embodiment, the multiplier is selected before selection of the symbols for the third further feature game.

In an embodiment, the available game outcomes of the first game comprise at least three available game outcomes, at least one of which is the first further feature game, at least one of which is the second further feature game and at least one of which is the third further feature game.

In accordance with a second aspect, the present invention provides a method of gaming, comprising the steps of playing a first game having a plurality of available game outcomes, displaying a representation of play of the first game, the representation comprising a selector having a plurality of outcome indicating parts and an indicator, determining a first game outcome for the first game from the plurality of available game outcomes, controlling the indicator to indicate the outcome indicating part associated with the first game outcome, wherein at least one of the available game outcomes is a further feature game, and playing the further feature game to determine a prize to be awarded.

In accordance with a third aspect, the present invention provides a computer program providing instructions for controlling a computer to implement a gaming system in accordance with the first aspect of the invention.

In accordance with a fourth aspect, the present invention provides a computer readable medium providing a computer program in accordance with the third aspect of the invention.

In accordance with a fifth aspect, the present invention provides a data signal comprising the computer program of the fourth aspect of the invention.

In accordance with a sixth aspect, the present invention provides a game controller for a gaming system, the game controller being arranged to control operation of a first game having a plurality of available game outcomes, and control operation of a display to display a representation of play of the first game, the representation comprising a selector having a plurality of outcome indicating parts and an indicator, the game controller being arranged to determine a first game outcome for the first game from the plurality of available game outcomes, and control the indicator to indicate the outcome indicating part associated with the first game outcome, at least one of the available first game outcomes being a further feature game, the game controller being arranged to control play of the further feature game to determine a prize to be awarded.

In accordance with a seventh aspect, the present invention provides computer program comprising instructions for controlling a computer to implement a game controller in accordance with the sixth aspect of the invention.

In accordance with an eight aspect, the present invention provides a computer readable medium, providing a computer program in accordance with the seventh aspect of the invention.

In accordance with a ninth aspect, the present invention provides a data signal, providing a computer program in accordance with the seventh aspect of the invention.

In one embodiment of this invention, the gaming system and method provide multiple levels of gaming. In one embodiment, there are three levels of gaming:

a first level (e.g. a base game which may be a reel game), which may lead to a second level of gaming as an outcome (e.g. a wheel game) which may lead to a third level of gaming (e.g. one of the feature games discussed above). Further, the third level of gaming may comprise a plurality of different third level games which may be selected by the second game outcome. Such multiple level gaming has the advantage of maintaining player interest and entertainment.

In accordance with a tenth aspect, the present invention provides a gaming system, comprising a game controller arranged to control operation of a first game having a plurality of available first game outcomes, and being arranged to determine a first game outcome from the plurality of available first game outcomes, at least one of the available first game outcomes being a second game having a plurality of available second game outcomes, the game controller being arranged to control play of the second game and determine a second game outcome from the plurality of available second game outcomes, at least one of the available second game outcomes being a third game having a plurality of available third game outcomes, the game controller being arranged to control play of the third game and determine a third game outcome from the plurality of available third game outcomes.

In an embodiment, the gaming system provides a plurality of different third games. The second game outcome may be one of the plurality of different third games.

In an embodiment, the first, second and third games are different games from each other.

In an embodiment, one of the first, second or third games is a reel game.

In an embodiment, one of the first, second or third games is a wheel game.

In an embodiment, the first game is a reel game and the second game is a wheel game.

In an alternative embodiment, the first game is a wheel game and the second game is a reel game.

In an embodiment, the third game is played to determine a prize outcome for the player. The prize may be a monetary award or other credit to the player. The games may be played based on a bet placed by the player on the games. Prize outcomes may also be available for the first and second games.

In accordance with an eleventh aspect, the present invention provides a method of gaming comprising the steps of playing a first game having a plurality of available first game outcomes, determining a first game outcome from the plurality of available first game outcomes, at least one of the available first game outcomes being a second game having a plurality of available second game outcomes, playing the second game and determining a second game outcome from the plurality of available second game outcomes, at least one of the available second game outcomes being a third game, playing the third game and determining a third game outcome.

In accordance with a twelfth aspect, the present invention provides a computer program providing instructions for controlling a computer to implement a gaming system in accordance with the sixth aspect of the invention.

In accordance with a thirteenth aspect, the present invention provides a computer readable medium providing a computer program in accordance with the twelfth aspect of the invention.

In accordance with a fourteenth aspect, the present invention provides a data signal comprising the computer program of the twelfth aspect of the invention.

BRIEF DESCRIPTION OF SEVERAL VIEWS OF THE DRAWINGS

Features and advantages of the present invention will become apparent from the following description of embodiments thereof, by way of example only, with reference to the accompanying drawings, in which.

DETAILED DESCRIPTION OF THE INVENTION

Figure 7:
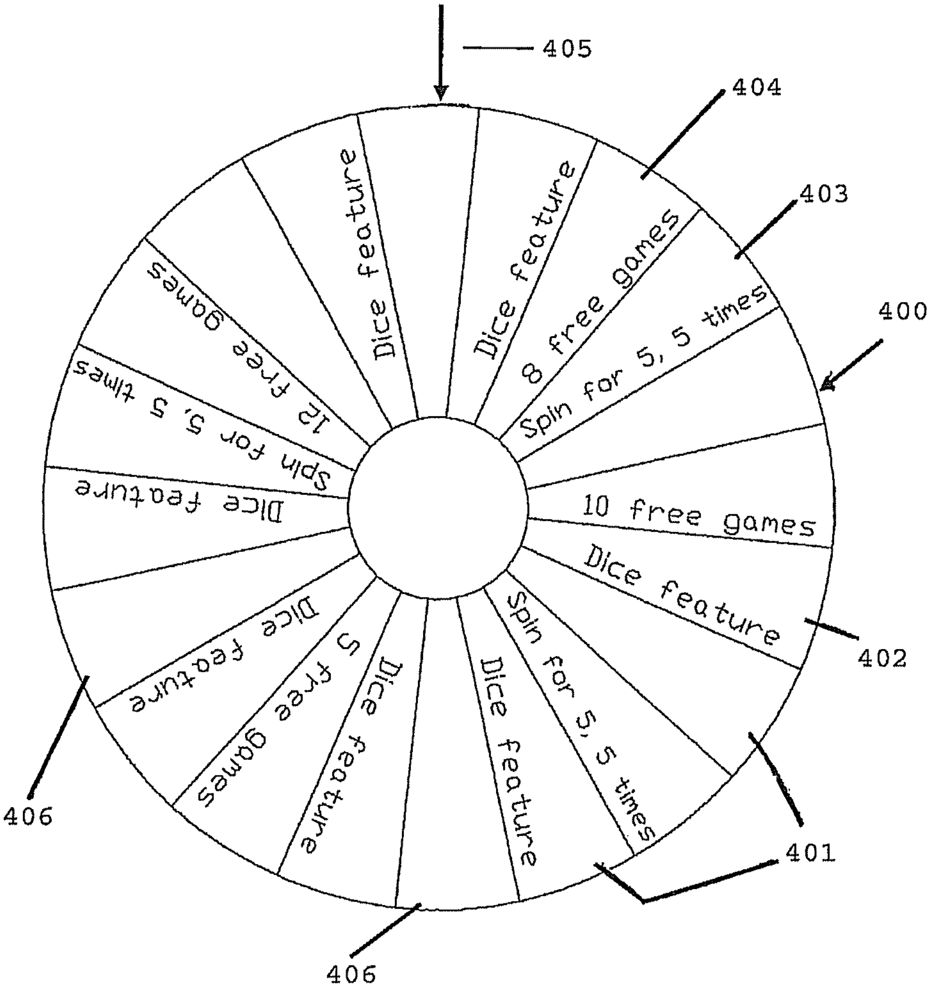
FIGS. 7 and 8 are representations of example displays generated by a gaming system in accordance with an embodiment of the present invention.

Referring to the drawings, there is illustrated an example embodiment of a gaming system which is arranged to implement a game. The gaming system includes a game controller and a display arranged to display representations of the game. The representations comprise a selector having a plurality of outcome indicating parts and an indicator, and in this example embodiment the representations comprising a wheel game. An example embodiment of the wheel game is illustrated in FIG. 7. The wheel representation 400 includes a plurality of outcome indicating parts 401. In this embodiment, a plurality of the outcome indicating parts indicate as an outcome a further feature game (see for example, outcome indicating parts 402, 403 and 404). The game controller is arranged to control play of the further feature game to determine a prize to be awarded to a player. This embodiment has the advantage of providing further levels of play for entertainment of a player and to maintain player interest. Further, higher prizes may be awarded than may normally be awarded by a wheel game having a finite number of outcome indicating parts.

The gaming system can take a number of different forms. In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Figure 1:
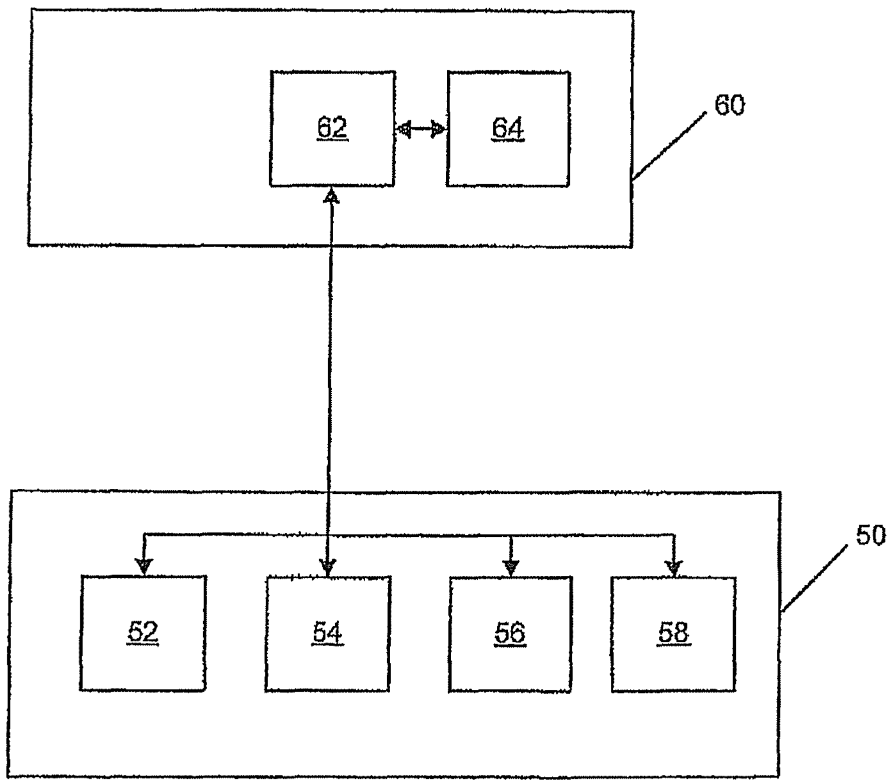
FIG. 1 is a schematic block diagram of core components of a gaming system in accordance with an embodiment of the present invention.

Irrespective of the form, the gaming system comprises several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions and play the game.

Components of the player interface may vary from embodiment to embodiment but will typically include a credit mechanism 52 to enable a player to input credits and receive payouts, one or more displays 54, a game play mechanism 56 that enables a player to input game play instructions (e.g. to place bets), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
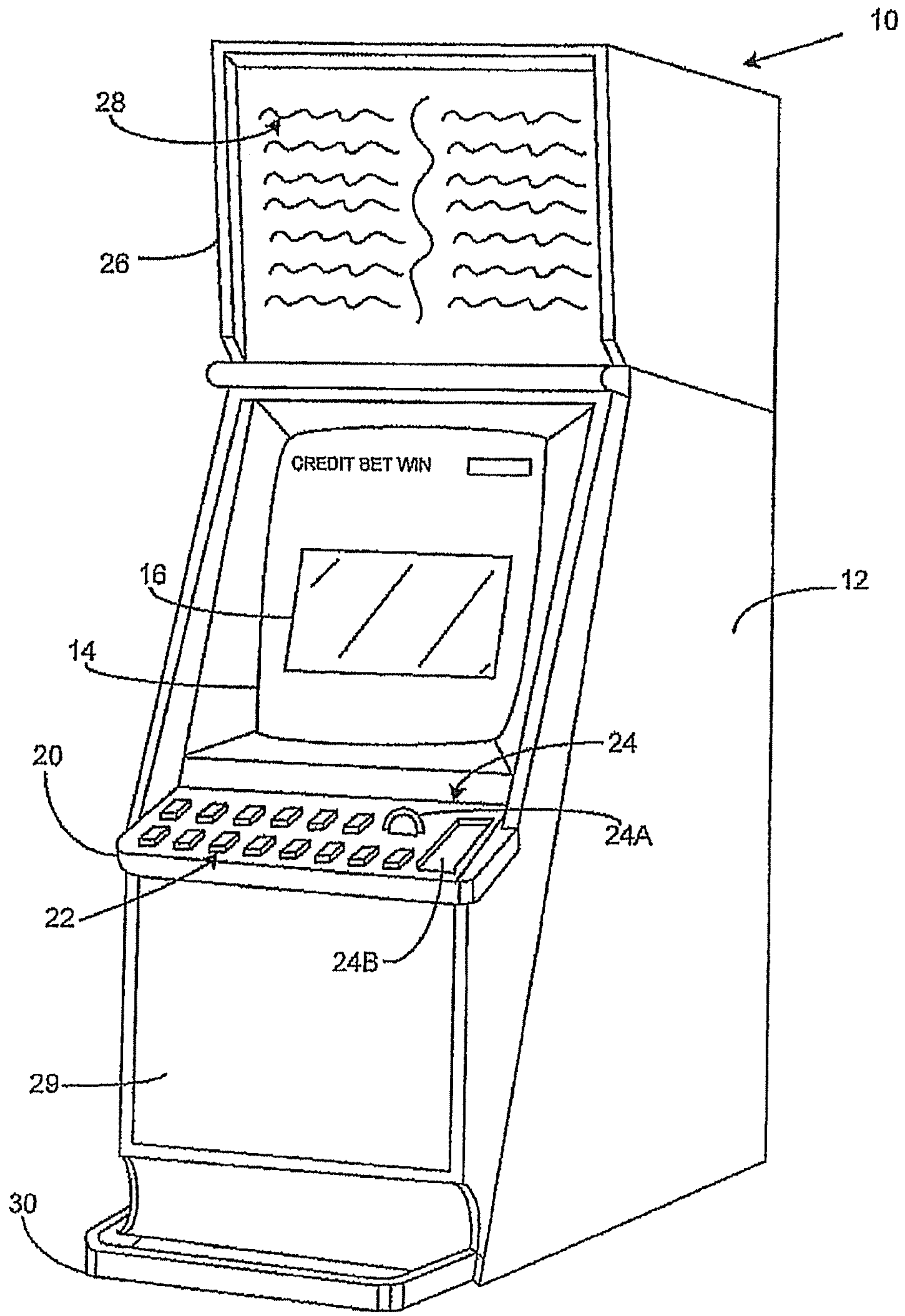
FIG. 2 is diagrammatic representation of a gaming system in accordance with an embodiment of the present invention with the gaming system implemented in the form of a stand along gaming machine.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module (not shown) having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
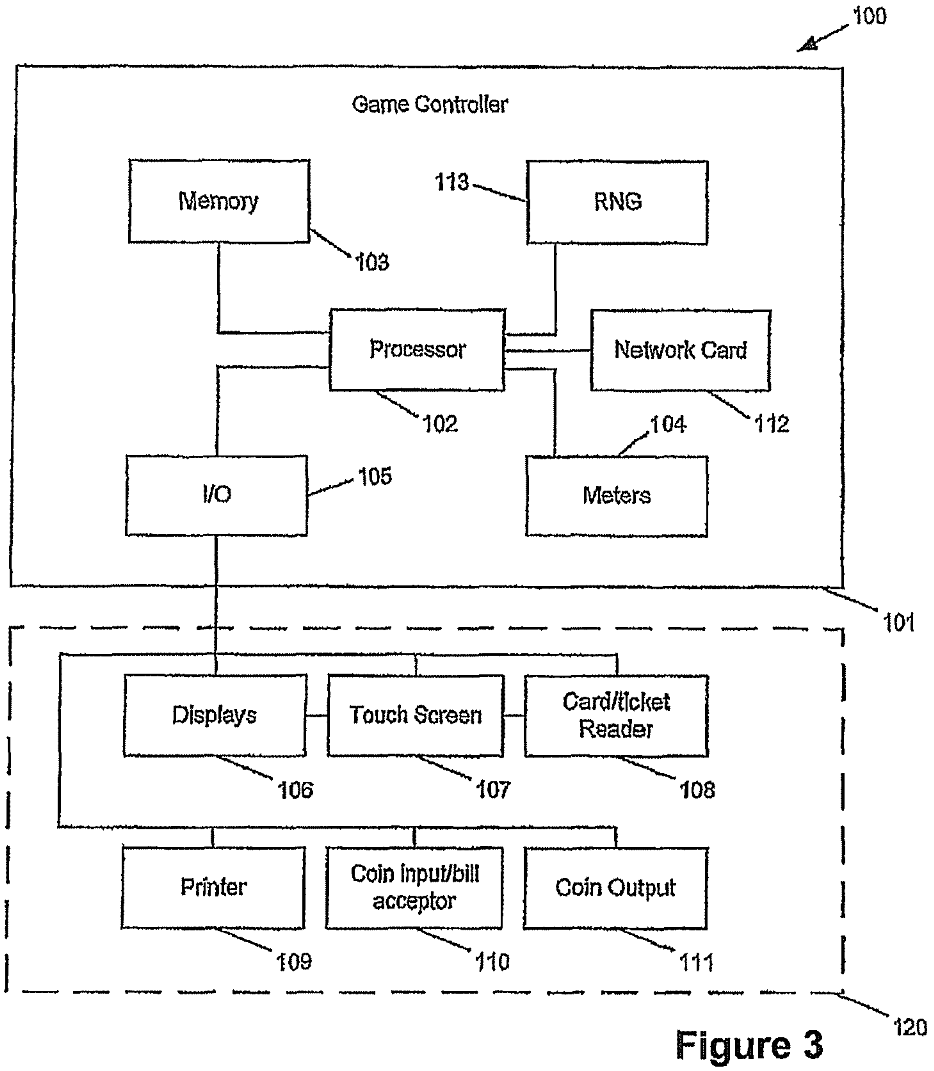
FIG. 3 is a schematic block diagram of operative components of the gaming machine shown in FIG. 2.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuing regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 comprise one or more displays 106, a touch screen and/or buttons 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
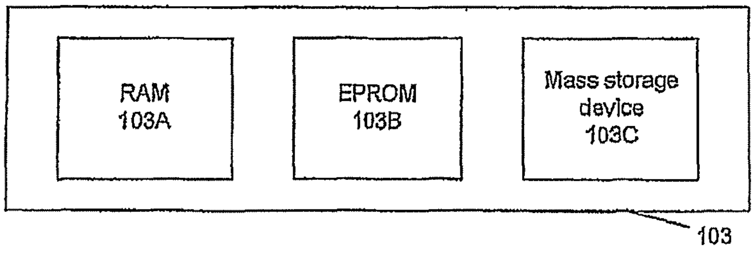
FIG. 4 is a schematic block diagram of components of a memory of the gaming machine shown in FIG. 2.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
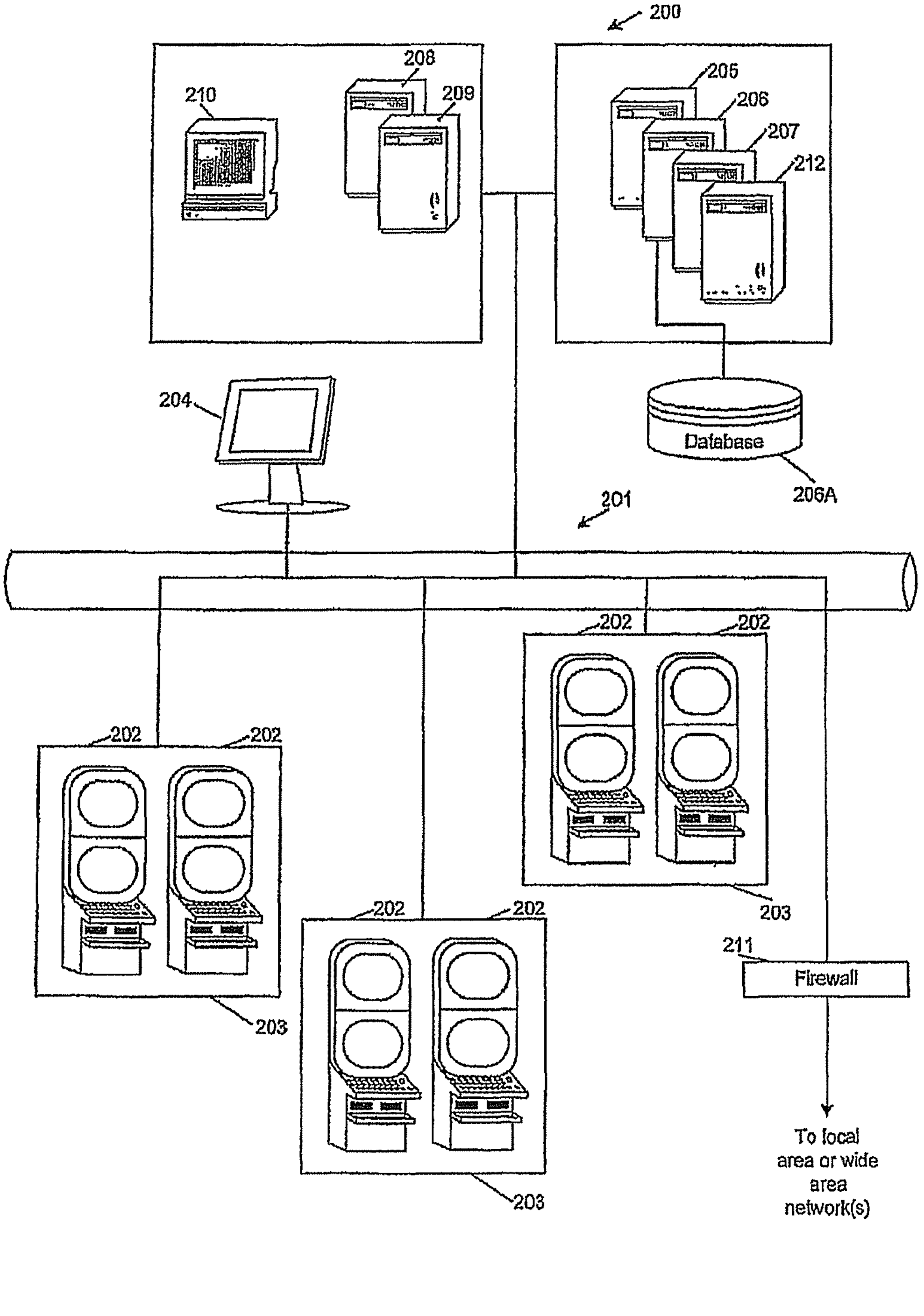
FIG. 5 is a schematic diagram of a gaming system in accordance with an alternative embodiment of the present invention with the gaming system implemented over a network.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming network 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Figure 6:
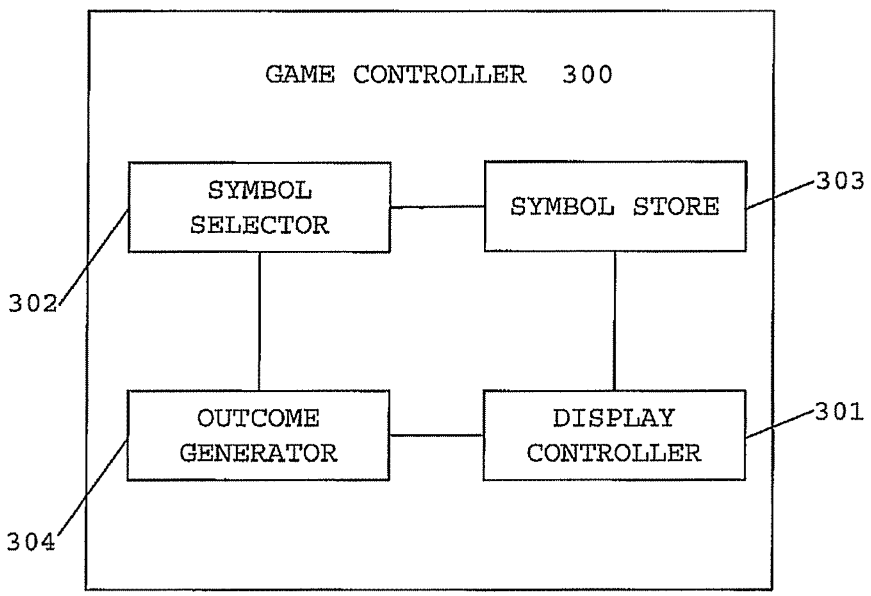
FIG. 6 is a schematic diagram of functional components of a gaming system in accordance with an embodiment of the present invention.

Referring to FIG. 6, the functionality of embodiments of the present invention may be implemented by a game controller having the functional components illustrated. In this embodiment, the functional components are implemented utilising a processor and memory, (such as processor 102 and memory 103 in FIG. 3, or processor 62 and memory 64 in FIG. 1, for the game server 205 in FIG. 5) and associated programming. Other implementations are envisaged. For example the functional blocks of FIG. 6 may be implemented in hardware as separate units, or a combination of hardware and software as separate units. Any practical implementation of these functional units may be employed.

In this embodiment, the game controller 300 is arranged to control the gaming system to play a base game which comprises selection of a plurality of symbols from a set of symbols. The base game is implemented as a "reel" game. The game controller 300 comprises a display controller 301 which is arranged to control the display (reference numerals 54, 14, 106, 204 of previous figures) to emulate a representation of reels bearing symbols. Alternatively, the display may comprise a stepper motor and physical reels bearing the symbols.

The game controller 300 includes a symbol selector 302 which is arranged to select a plurality of symbols from a set of symbols available in a symbol store 303. An outcome generator 304 is arranged to determine an outcome of the base game. In this embodiment, the outcome of the base game depends on the selected symbols and may include a win outcome, loss outcome, a feature outcome, or other outcome. Outcomes may be determined on the basis of symbols appearing in one or more horizontal lines, diagonal lines, or any other pre-determined combinations.

Figure 8:
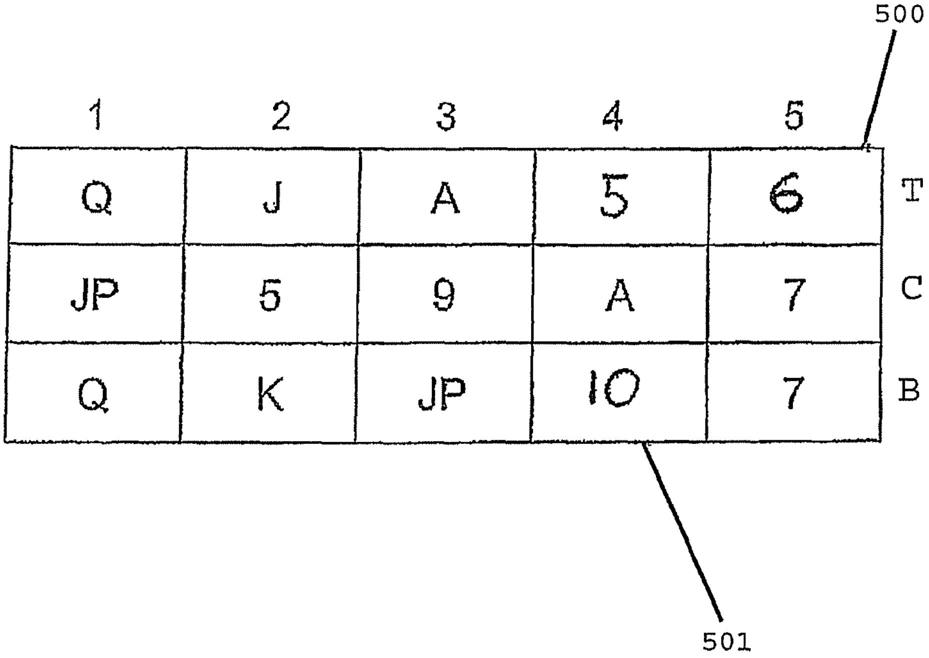
Figure 9:
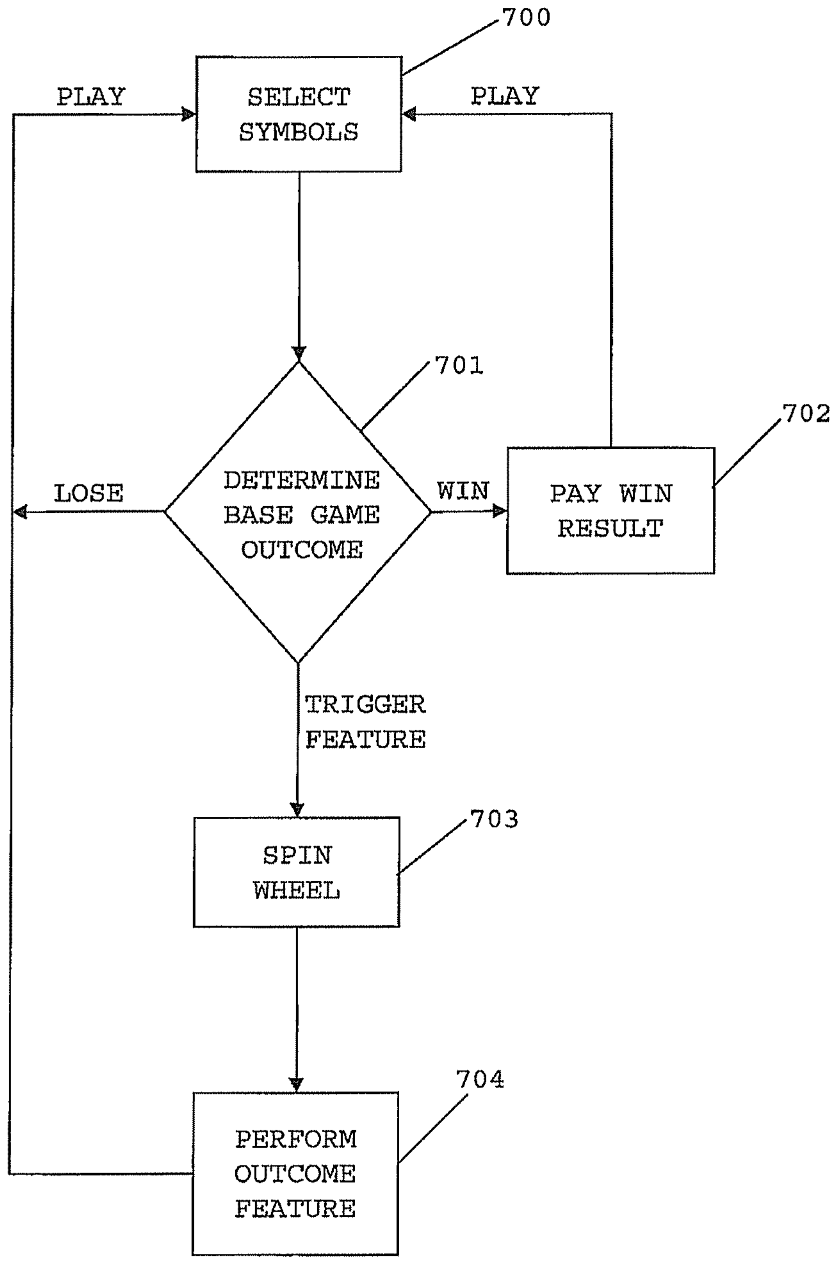
FIGS. 9 to 12 are flow diagrams illustrating operation of a gaming system in accordance with an embodiment of the present invention.

FIG. 8 shows a schematic representation of a gaming machine display 500 which, in the example shown, has five reels (numbered "1" to "5"). The display window 501 shows three reel positions high when the reels have stopped/the symbols have been selected. The reel positions are designated Bottom ("B"), Centre ("C") and Top ("T"). This is a typical reel-type display for a gaming machine. It will be appreciated that in other embodiments the number of reel positions may be more or less than in display 500. Also the number of reels may be more or less than in the display 500.

The reels may be virtual reels, generated as a video display from the selected symbols, actual mechanical reels carrying the symbols and driven by a stepper motor, or any other reel arrangement or emulation. In the case of actual physical reels, the game controller drives a stepper motor to randomly select the symbols appearing in the display 500.

The game outcome is determined by the outcome generator 304 based on combinations of symbols selected and appearing in the display 500. The symbols may be any symbols. As will be appreciated, many different types of symbols are used in gaming systems. A set of symbols may include standard symbols and function symbols. For example, standard symbols may resemble fruit such as apples, pears and bananas with a win outcome being determined when a predetermined number of the same fruit appear on a display in the same line, scattered, and so on. The function associated with a function symbol may be a "wild" function wherein display of the function symbol is treated during consideration of the game outcome as any of the standard symbols. Other functions may include scatter functions, multiplier functions, repeat win functions, jackpot functions and feature commencement functions.

In the example shown in FIG. 8, the symbols are representations of cards, by which a poker-type card game may be played. In this example, a winning poker hand appearing on the C line may cause the outcome generator to determine that a Win has occurred and that an appropriate prize may be awarded. For example, five of a kind (e.g. 5 jacks "J". 5 tens "10" etc on the C line may result in a win. A straight or a straight flush or any other poker combination on the C line may also result in a win.

In addition to card symbols, the symbols also include a Wild "W" symbol which is a function symbol which, when it occurs on the C line may be considered by the outcome generator 304 to operate as any symbol which may assist in a win. Symbols also include a Jackpot ("JP") symbol which when five JP symbols appear on the C line may result in a jackpot win. The jackpot may be a progressive jackpot, a linked progressive jackpot, or any other type of jackpot.

The diagram shown in FIG. 8 is schematic only and it will be appreciated that embodiments of the invention may implement the symbols graphically, with fancy artwork or in any other appropriate manner.

A game outcome may include a win entitlement which may result in a prize being awarded to a player.

Persons skilled in the art will appreciate that a player's win entitlement will vary from game to game and may or may not be dependent on player selections. In most spinning reel games, it is typical for the player's entitlement to be affected by the amount they wager and selections they make (i.e. the nature of the wager). For example, a player's win entitlement may be based on how many lines they will play in each game—i.e. a minimum of one line up to the maximum number of lines allowed by the game (noting that not all permutations of win lines may be available for selection. Such win lines are typically formed by a combination of displayed symbol positions, one from each reel, the symbol positions being located relative to one another such that they form a line.

In many games, the player's win entitlement is not strictly limited to the lines they have selected. For example, "scatter" pays may be awarded independently of a players selection of pay lines and may be an inherent part of the win entitlement.

Persons, skilled in the art, will appreciate that in other embodiments, the player may obtain a win entitlement by selecting a number of reels to play. Such games are marketed under the trade name "Reel Power" by Aristocrat Leisure Industries Pty Ltd. The selection of the reel means that each symbol of the reel can be substituted for a symbol at one or more designated display positions. In other words, all symbol positions of a selected reel can be used to form symbol combinations with designated, displayed symbol positions of other reels.

In other embodiments a player win entitlement may be affected by purchasing access to particular pay tables—e.g. a first bet amount entitles the player to wins including cherries and a second amount entitles them to wins including plums. The win entitlement is not always purchased—e.g. a series of free games may be awarded.

In this embodiment of the present invention, at least one of the base game outcomes is a trigger for a feature game. The trigger may be any combination of symbols, including a line of symbols or a scatter. Any trigger condition may be determined to instigate the feature game. Multiple trigger conditions may exist. A trigger condition may be based on a measure of time, a particular amount of activity of the machine, based on player tracking information or maybe a random event, or any other trigger condition. The trigger condition will be determined by the game designer.

In this embodiment the feature game is a first game represented on the display as a selector having a plurality of outcome indicating parts and an indicator. In this example it is implemented as a wheel game (FIG. 7).

Referring to FIG. 7, the display controller 301 generates a display comprising a selector 400 having a plurality of outcome indicating parts 401 and an indicator 405. The outcome indicating parts 401 form segments for a wheel, such that the selector 400 is represented as a wheel. The indicator 405 is a stationary arrow and, during play, the display of the outcome indicating parts 401 is controlled to appear as if the wheel is spinning. The revolving of the outcome indicating parts 401 is controlled by the display controller 301 so that the outcome indicating parts 401 come to rest with the outcome indicating part 401 selected by the game controller as the first game outcome, being adjacent the indicator 405. The game controller 300 is arranged to determine the game outcome in this embodiment by selection of one of the segments 401 via a random number generator (such as reference numeral 113 in FIG. 3). The "spin" of the wheel 400 is "fair", there being 20 segments 401 of the wheel 400 in this embodiment, each segment having an equal chance of being selected by the random number generator (i.e odds for segment selection of 20:1).

It will be appreciated that, in other embodiments, the wheel may have less or more segments than the wheel of FIG. 7.

Each segment 401, or outcome indicating part, is associated with a first game outcome. A plurality of the game outcomes result in further feature games. In this embodiment, there are 14 segments which result in generation of a further feature game to be played by the gaming system. In this example, the other 6 segments are blank segments 406. Blank segments do not result in the generation of any further feature game. No prize is awarded to a player and no action is performed. The feature game (the first game) ends here and the player may then choose to go back and play the base game.

Of the 14 segments which generate a further feature game outcome, three different further feature games are available.

The first further feature game, designated "dice feature" 402 in this embodiment results in the game controller 300, via the display controller 301, generating a further display displaying a representation of a further selector. The further selector has a plurality of outcome indicating parts indicating the available further selector outcomes. The game controller 300 is arranged to determine a further selector outcome and the display is controlled to represent the further selector outcome. In this example, the further selector is one in a sequence of further selectors. At least one of the available further selector outcomes is a "sequence continue" outcome. If this outcome is selected by the game controller 300, then the game controller controls play of the next further selector in the sequence of further selectors. If the "sequence continue" outcome is not selected by the game controller, then the sequence ends and any prize is calculated and awarded (the prize depending on the further selector outcome). The more selectors that are played, the greater the prize. In this example, each selector in the sequence is represented on the display as a six-faced (cubical) die. Each face of the die contains a single digit from 0 to 9. The game controller 300 utilises a random number generator to determine the outcome for each further selector in the sequence. The outcome is "fair" (i.e. probability of 6:1 for each selector). If the result of the spin is a non-zero digit then a prize represented by the digit is awarded immediately to the player and the first further feature game and the feature game end and the player may return to the base game. If the result of the spin is zero then that particular die remains displayed (as zero) and a second similar die (the next further selector in the sequence) is displayed to the left of the first one and spun. Again, the selection is "fair", and any prize resulting from this spin is multiplied by 10, as indicated by a natural reading of the die faces from left to light in accordance with a base 10 numbering system. Several further selectors (represented as dice in this example) may be operated in this way if all previous spins select 0 the "sequence continue" outcome in this embodiment). To terminate the sequence of further selectors, there is always a further selector with no "sequence continue" outcome available. Where the further selectors are represented as die, there is a die at the end of the sequence with no zero on any faces in order to limit the size of the win.

In this embodiment, the faces of the die are numbers. The prize may correspond with that number, e.g. the prize may be a number of credit units awarded to the player corresponding with the number shown by the sequence of selectors. Alternatively, the prize may be a multiple of the number or any other variation. In an alternative embodiment, the die may not show numbers but may show other indicators indicating prizes. In an embodiment, the die may have a number of faces other than six. The invention is not limited to a six face die.

In this example embodiment, the base game played by the gaming system is a "Reel Power" type game. The player may select one or more reels to play the base game (e.g the player may place bets on one or more reels). In this embodiment, the feature game (the wheel game) is triggered on any four of a kind picture symbols or Scatter, on the bought position appropriate for that symbol (i.e. Pic1 . . . Pic4 . . . will trigger the feature if any four appear anywhere on bought reels, or on the centre line of unbought reels; Scatter will trigger the feature on four of a kind anywhere in the window).

In this embodiment, the faces of each of the die in the sequence of dice is fixed, determined by the number of reels bought, in accordance with the following tables. Prizes for the die sequence in this embodiment are multiplied by bet per reel only.

Dice Faces for Dice Feature

1 Reel Bought

| dice 4 | dice 3 | dice 2 | dice 1 | dice 0 |
|---|---|---|---|---|
| 3 | 1 | 1 | 1 | 1 |
| 1 | 2 | 2 | 2 | 2 |
| 1 | 3 | 3 | 3 | 3 |
| 1 | 2 | 2 | 2 | 2 |
| 1 | 1 | 0 | 1 | 1 |
| 1 | 0 | 0 | 0 | 0 |

2 Reel Bought

| dice 4 | dice 3 | dice 2 | dice 1 | dice 0 |
|---|---|---|---|---|
| 1 | 0 | 9 | 9 | 9 |
| 1 | 5 | 4 | 8 | 8 |
| 1 | 4 | 3 | 7 | 7 |
| 2 | 3 | 0 | 6 | 0 |
| 2 | 2 | 0 | 0 | 0 |
| 3 | 1 | 0 | 0 | 0 |

3 Reel Bought

| dice 4 | dice 3 | dice 2 | dice 1 | dice 0 |
|---|---|---|---|---|
| 1 | 0 | 9 | 9 | 9 |
| 1 | 5 | 4 | 8 | 8 |
| 1 | 4 | 3 | 7 | 7 |
| 2 | 3 | 0 | 6 | 0 |
| 2 | 2 | 0 | 0 | 0 |
| 3 | 1 | 0 | 0 | 0 |

4 Reel Bought

| dice 4 | dice 3 | dice 2 | dice 1 | dice 0 |
|---|---|---|---|---|
| 1 | 0 | 9 | 9 | 9 |
| 1 | 5 | 4 | 8 | 8 |
| 1 | 4 | 3 | 7 | 7 |
| 2 | 3 | 0 | 0 | 6 |
| 2 | 2 | 0 | 0 | 0 |
| 3 | 1 | 0 | 0 | 0 |

5 Reel Bought

| dice 4 | dice 3 | dice 2 | dice 1 | dice 0 |
|---|---|---|---|---|
| 1 | 0 | 9 | 9 | 9 |
| 1 | 5 | 4 | 8 | 8 |
| 1 | 4 | 3 | 7 | 7 |
| 2 | 3 | 0 | 6 | 6 |
| 2 | 2 | 0 | 0 | 0 |
| 3 | 1 | 0 | 0 | 0 |

Figure 13:
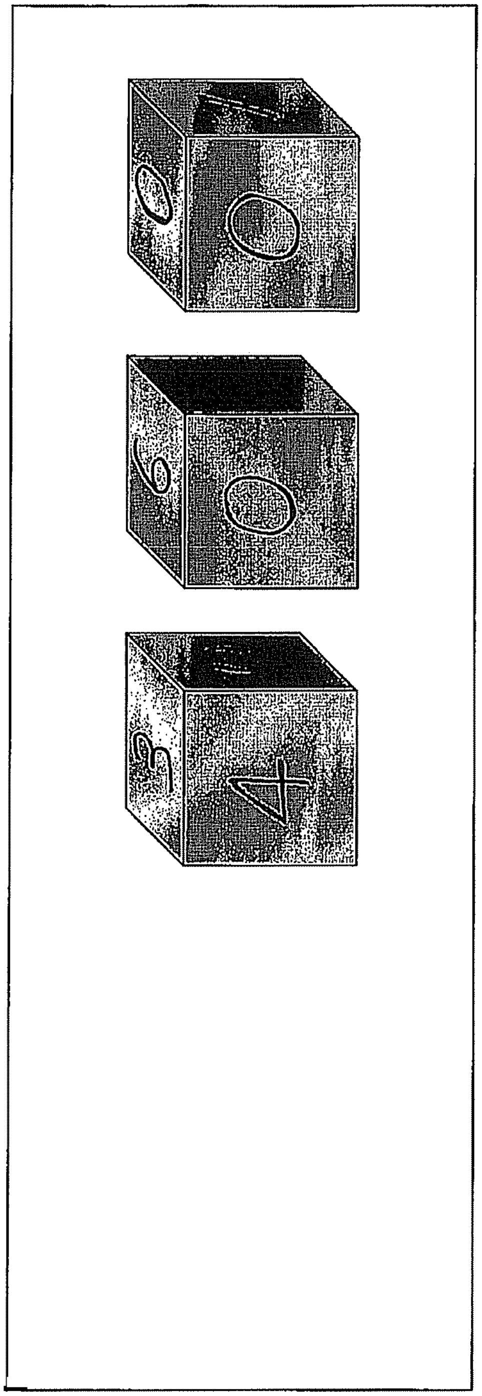
FIG. 13 is a representation of an example display generated by a gaming system in accordance with an embodiment of the present invention.

In this embodiment, the further selectors are represented as dice. It will be appreciated that the invention is not limited to the further selectors being represented as dice. They may be any selector representation, including wheels, for example. The faces of each die in the sequence of die are not limited to those designated in the above tables. This is one example only and the faces may be varied from this in other embodiments. FIG. 13 shows a example display representing a plurality of dice as generated in accordance with this embodiment. Three dice are displayed based on a 2 reel bought bet (see above table). Dice 2 displays a "4", so dice 3 and 4 are not displayed in this example.

In the above-described embodiment, the first further feature game includes a sequence of selectors. In an alternative embodiment, the first further feature game may include a single selector only e.g. a single die.

In this embodiment, the wheel display 400 of the first game is generated as a virtual display emulating a wheel. For example, it may be displayed on display 54, 14, 106 of the previously referenced Figures. In one embodiment, it may be emulated by a top box 26 display of the stand alone machine 52 of FIG. 2. Representations of the further selectors during play of the first further feature game are also emulations displayed by a display, which also may be a top box 26 display, which may be in a different position to the wheel display, or which may replace the wheel display when it is played, or may be displayed in any other way.

Another available outcome of the first game is a second further feature game. In this embodiment, the second further feature game is designated "Spin for Five, N Times". Referring to FIG. 7, reference numeral 403 designates an outcome indicating part "Spin for Five, 5 Times". In this embodiment, as discussed above, the base game which generates the first game as a feature is a Reel Power type game. The feature game is triggered on any of four of a kind picture symbols or Scatter. In the second further feature game, the four of a kind reels that triggered the first game as a feature are held and the remaining reel is spun N times. Following each re-spin any resulting winning combination is paid according to the score card. The re-spin is paid at the bought number of reels and bet per reel. The first game cannot retrigger during the re-spin.

In this embodiment "N" is five. It need not be five. Any number of re-spins may be implemented and in other embodiments N may be any number. Further, in this embodiment four reels are held and the fifth reel is spun. This is for a five reel machine. In an alternative embodiment less than four reels may be held e.g. three or two. In other embodiments where there may be different numbers of reels, different numbers of reels may be held and the others spun.

The third further feature game is designated “N free games” (see reference numeral 404 in FIG. 7, which indicated a third further feature game outcome). When this outcome of the first game is achieved, the game controller is arranged to control the gaming system to play the “N” number of free reel games. In this embodiment, based on Reel Power, the designated number of free games are played. In addition, prior to playing the free games, a random multiplier is awarded. In this embodiment the random multiplier may be one, two, five or ten. The random multiplier is selected according to a fixed weighting table, which depends on the bet per reel in the base game. The random multiplier is also displayed on the display. Any win from the free game played is multiplied by the displayed multiplier. Further, the first game may be retriggered during any one of the free games, which may result in further free games being added to those remaining to be played. The first game is played immediately following the free game that triggered it. Only the basic score card prize for the free game is multiplied by the multiplier i.e. the multiplier does not apply to the spin-for-five or dice feature wins that may be triggered by the free game.

The weighting table for the random multiplier is as follows. Multiplier Weighting Table

| | Reels: | | | | |
|---|---|---|---|---|---|
| | 1 | 2 | 3 | 4 | 5 |
| Mult | | | Weights | | |
| ×1 | 95 | 223 | 299 | 270 | 344 |
| ×2 | 13 | 100 | 98 | 99 | 113 |
| ×5 | 10 | 110 | 100 | 78 | 81 |
| ×10 | 10 | 412 | 100 | 105 | 109 |

Note that the weightings are not limited to the weightings given in the above table. This is one example only. The weightings may be varied from this in other embodiments.

In this embodiment, the free games are played by the same reels as the base game and prizes are paid according to the same outcomes as the base game. The invention is not limited to this. In other embodiments, a separate reel game may be played for the free games, which may have different symbols and different symbol combinations, and also different prize outcomes.

An advantage of the gaming system of at least this embodiment of the invention is that, by providing multiple levels of games i.e. the first game, and then the further feature games, many different levels of gaming are provided for the player. Variability of games is attractive and maintains interest for players. Providing a variety of rewards advantageously maintains the interest of the player.

The game playing process of the embodiment described above will now be summarised with reference to FIGS. 9 through 12.

At step 700 (FIG. 9), the base game is played by a selection of symbols from the symbol store 303 by the symbol selector 302. At step 701, an outcome of the base game is determined. Depending on the combination of symbols, this may be a “win”, in which case a Win Result (step 702) is determined for the player. The player may then have the choice to play again. If the result is a “Lose” result, the player again has the choice of whether or not to play again. A further outcome for the base game is to trigger the feature, in which case the first game is played and the wheel is spun (step 703).

At step 704, the outcome of the first game is determined, and if this is a further feature game, then the further feature game is played (step 704). If it is a “blank” then the play returns to the base game and no further feature is performed.

Figure 10:
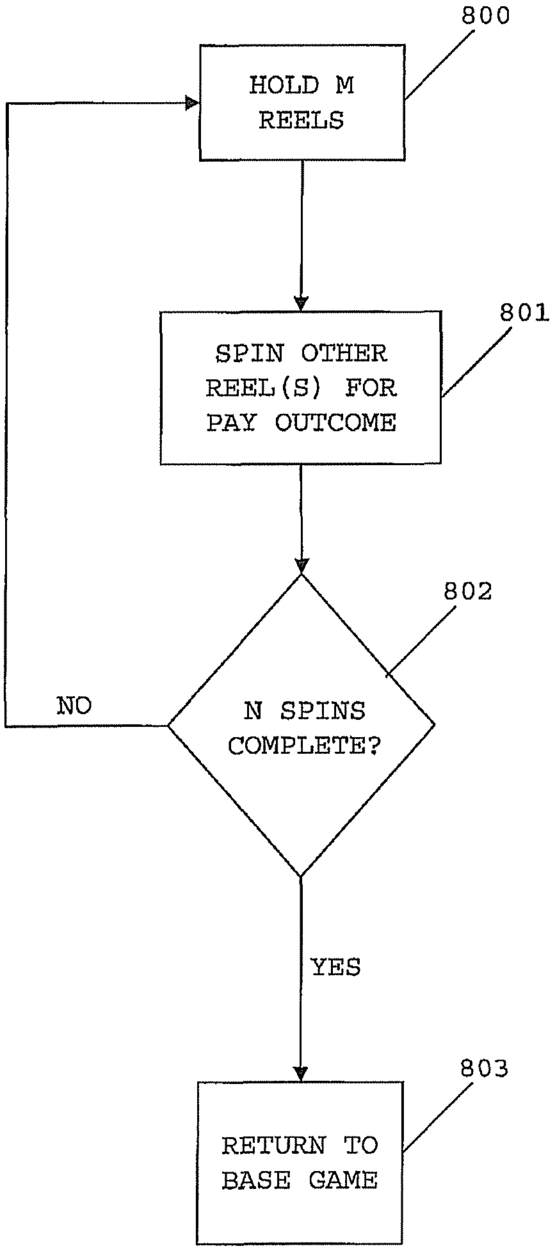

FIG. 10 summarises the process where the further feature game is the second further feature game. A number of reels are held at step 800 (in the above embodiment this will be four reels). At step 801 the other reel or reels is spun and any prize is paid. At step 802 it is determined whether all the free spins of the reels have been completed. If YES, at step 803 the player has the choice to return to the base game. If NO, the reel or reels are spun again.

Figure 11:
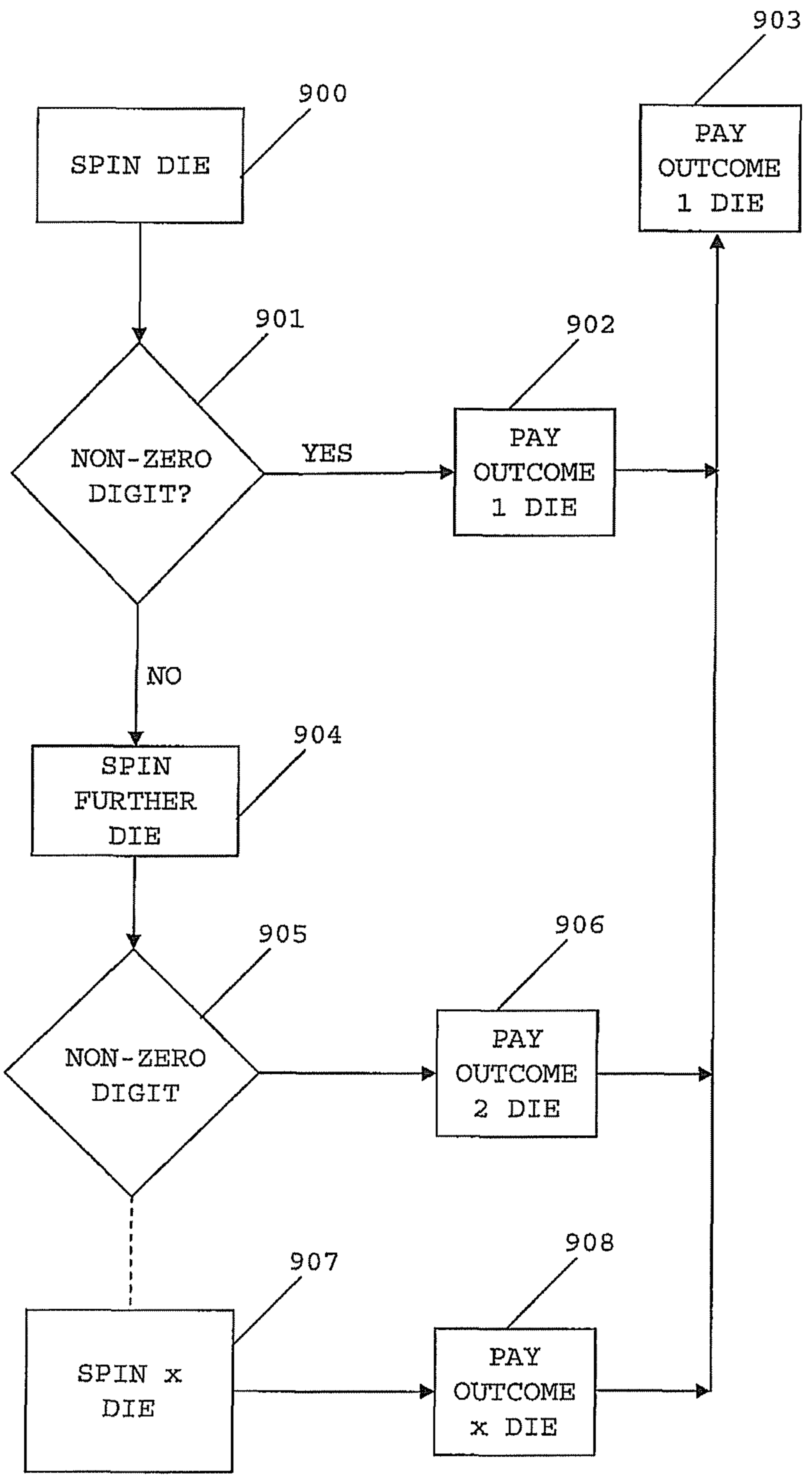

FIG. 11 summarizes the game playing process of the first further feature game in accordance with this embodiment. At step 900 the further selector is played and represented as a spinning die. At step 901 it is determined whether the outcome is a non-zero digit. If YES, the outcome is paid (step 902) and then the system returns to the base game, step 903.

If the outcome of the first selector is a zero digit, however, then a further selector is played, represented as spinning of a further die, step 904. At step 905 the outcome of the further die is determined. If it is a non-zero digit, at step 906 the outcome is paid to the player, based on the total from the two dice displayed in accordance with a base ten numbering system. If the outcome is a further zero digit, then a further die is played and outcome determined. This may continue until the last selector which does not include a zero outcome (step 907 and step 908).

Figure 12:
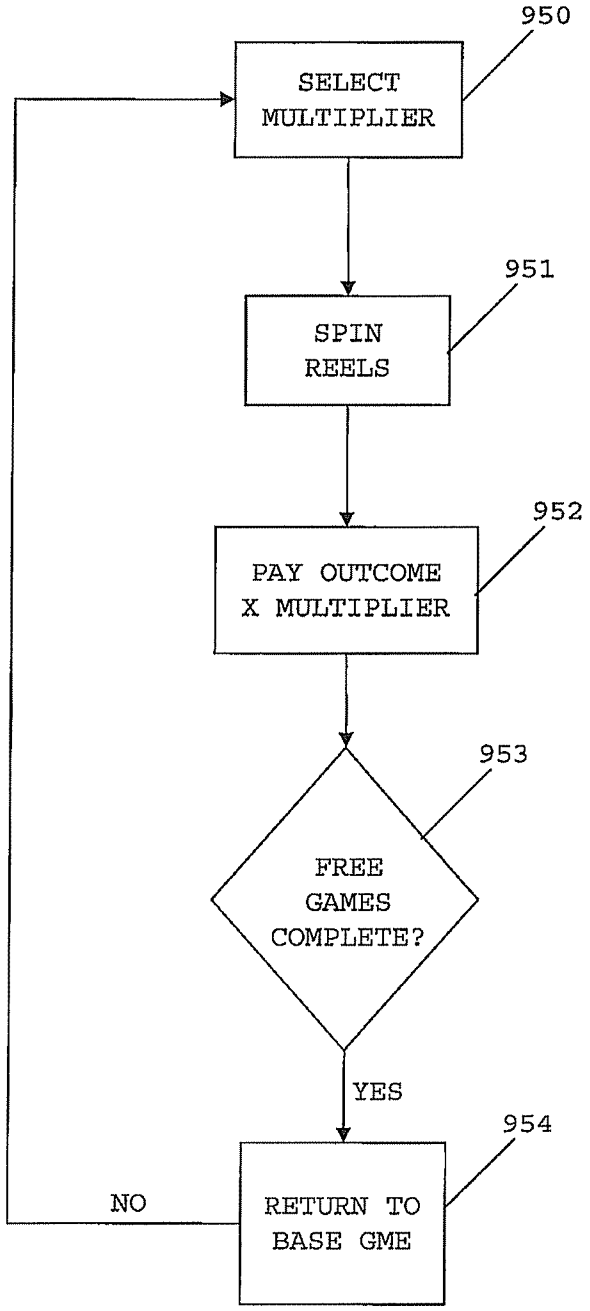

The game playing process for the third further feature game is summarised in FIG. 12. When the third further feature game is generated as an outcome of the first game, at step 950 the multiplier value is selected (see above table). The reels of the base game are spun at step 951 and the outcome multiplied by the multiplier is paid at step 952. At step 953 determination is made as to whether the number of free games of the third further feature game have been completed. If NO, step 950 is returned to and a new multiplier is selected. If YES, the system returns to the base game at step 954.

In the above embodiments, various terms are used to describe the further feature games e.g. “dice game”. This is a choice of terminology only and the invention is not limited to this terminology. The further feature games may be called anything that the game designer chooses.

In the above described embodiments, the base game (or other reel feature game) are emulated as reels or implemented as actual reels. In an alternative embodiment, the display may not emulate reels but merely show the selected symbols in a non-reel format e.g. presenting them as emulated playing cards, or other graphical representations. In such an embodiment, each selection of a set of symbols is equivalent to one “spin” of the reels. The term “reel game”, as used in this specification, encompasses such an implementation.

The base game need not necessarily be a game based on symbol selection, but could be any other type of game.

In the above described embodiment, the first game and the further feature games are generated as a feature of a base game. In alternative embodiments, the first game and further feature games may stand alone and may not be associated with any base game.

In the above embodiment, the base game is a “Reel Power” type game. The invention is not limited to this. Where a base game is played to give rise to the first game, the base game may be any type of game. It may be an alternative reel type game to Reel Power or any other game.

In the above embodiment, there are first, second and third further feature games as outcomes of the first game. In other embodiments, only one of these further feature games may be an outcome, or two. The invention is not limited to having all three further feature games as an outcome of the first game.

In the above described embodiment, there are three “levels” of gaming. The base game, in the above embodiment being a reel game, provides a first level of gaming. An outcome of this first level of gaming is a second level of gaming (in the above embodiment, being implemented as a wheel game). An outcome of the second level of gaming is a third level of gaming, in the above embodiments being a feature game generated as an outcome of the wheel game. Multiple levels of gaming are thus provided for the entertainment and interest of the player. Further, the third level of gaming may include a plurality of different games that may be selected at the second level of gaming. In the above embodiment, there are three different feature games that may be selected by the wheel. The invention is not limited to three different third games, however, and there may any number, from one upwards.

In alternative embodiments, the first level of gaming may be any game and need not be a reel game. For example, it could be a wheel game or any other type of game. Further, the second level of gaming could be a reel game, a wheel game or any other type of game. Also the third level of gaming. It will also be appreciated that in other embodiments there may be multiple gaming levels, not just three levels. There may be more than three levels.

In the above described embodiments, the wheel feature is an emulation of a wheel on a video display. In an alternative embodiment, the wheel display may comprise a mechanical wheel and indicator or electro-mechanical wheel and indicator. Embodiments of the invention may utilise any practical implementation of the wheel feature.

The further selector may also be implemented mechanically or electromechanically.

In the embodiment described with reference to FIG. 7, the indicator 502 comprises a stationary arrow and the segments of the wheel are arranged to move. The indicator may take different forms from this. For example, the indicator may comprise a plurality of chaser lights which select one or more of the outcome indicating parts. The indicator may be an arrow or a type of indicator that travels around the periphery of the wheel in continuous or small steps. The indicator may take the form of lighting up one or more of the outcome indicating parts. Any method of indication may be used.

In the above embodiments, the wheel feature is a traditional circular wheel, with the plurality of outcome indicating parts being segments of the wheel. In alternative embodiments, the wheel feature may be generally rectangular, triangular, or polygonal in overall shape. In an alternative embodiment, the feature may not be a wheel at all, and could be, for example, a series of adjacent segments with an indicator moving between the segments. Other implementations are also possible.

It will be appreciated that the above described embodiments may be implemented utilising program code. The program code may be supplied in a number of ways, for example in a computer readable medium, such as a disk or a memory, or as a data signal (by downloading it from a server).

In the claims which follow and in the preceding description of the invention, except where the context requires otherwise due to express language or necessary implication, the word “comprise” or variations such as “comprises” or “comprising” is used in an inclusive sense, i.e. to specify the presence of the stated features but not to preclude the presence or addition of further features in various embodiments of the invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A gaming system, comprising a game controller arranged to control operation of a base game, from which is triggered a first game having a plurality of available first game outcomes, and a display arranged to display a representation of play of the first game, the representation comprising a first selector having a plurality of outcome indicating parts, at least one blank indicating part and an indicator, the game controller being arranged to determine a first game outcome for the first game from the plurality of available game outcomes, and to control the selector to indicate the outcome indicating part or the blank indicating part associated with the first game outcome; and wherein at least one of the available first game outcomes is a further feature game, the game controller being arranged to control play of the further feature game to determine a prize to be awarded, the further feature game being different to the base game and comprising a plurality of second selectors that are initiated in sequence, wherein at least one outcome of a second selector is a sequence continued outcome, and wherein the next in sequence of the second selectors is only initiated when said sequence continue outcome occurs; and wherein at least one other of the available first game outcomes is a game ending outcome in which the selector indicates the at least one blank indicating part, the gaming controller being further arranged to end the first game in response to the indication of at least one blank indicating part.

2. A gaming system in accordance with claim 1, wherein at least one of the available outcomes of a second selector determines a prize to be awarded.

3. A gaming system in accordance with claim 2, wherein the game controller is arranged to control the display to display a representation of the further feature game, the representation comprising the plurality of second selectors, each second selector having a plurality of outcome indicating parts indicating the available further selector outcomes.

4. A gaming system in accordance with claim 3, wherein the representation of the second selector is of a die, and wherein the plurality of outcome indicating parts of the second selectors are represented by faces of the die.

5. A gaming system in accordance with claim 2, wherein the prize to be awarded depends upon the number of second selectors in the sequence that are played.

6. A gaming system in accordance with claim 1, wherein the game controller is arranged to control the display to display a representation of each of the second selectors in the sequence of second selectors.

7. A gaming system in accordance with claim 6, wherein if a second selector in the sequence is not played, a representation of that second selector is not displayed.

8. A gaming system in accordance with claim 6, wherein the representation of each second selector of the sequence comprises a display of a die, the outcome indicating parts of each second selector being represented by faces of the respective die.

9. A gaming system in accordance with claim 8, wherein the game controller is arranged to control the display to represent each die in the sequence to show a face which represents the second selector outcome determined by the game controller for each second selector in the sequence.

10. A gaming system in accordance with claim 1, wherein the first game is a wheel game and each of the outcome indicating parts is represented as a segment of a wheel.

11. A gaming system in accordance with claim 1, wherein the first game is generated as an outcome of a base game.

12. A gaming system in accordance with claim 1, wherein the base game is a reel game.

13. A method of gaming using a game controller and a display, comprising the steps of:

playing via the controller a base game;

triggering from the base game a first game having a plurality of available game outcomes;

displaying on the display a representation of play of the first game, the representation of play of the first game comprising a first selector having a plurality of first outcome indicating parts, at least one blank indicating part and an indicator;

determining via the game controller a first game outcome for the first game from the plurality of available game outcomes;

controlling via the game controller the selector to indicate the outcome indicating part or the blank indicating part associated with the first game outcome; and wherein at least one of the available first game outcomes being a further feature game, and playing via the game controller the further feature game to determine a prize to be awarded, the further feature game comprising a plurality of second selectors;

initiating the plurality of second selectors in sequence; and wherein at least one outcome of the plurality of second selectors is a sequence continue outcome;

initiating the next in sequence of the second selectors only when said sequence outcome occurs;

and wherein at least one other of the available first game outcomes is a game ending outcome in which the indicator indicates the at least one blank indicating part;

and ending the first game via the controller in response to the game ending outcome.

14. A method in accordance with claim 13, comprising the step of displaying a representation of the further feature game, the representation comprising the plurality of second selectors having a plurality of outcome indicating parts; and indicating a second selector outcome.

15. A method in accordance with claim 14, wherein the representation of the further selector is of a die, and wherein the plurality of outcome indicating parts are represented by faces of the die.

16. A method in accordance with claim 13, wherein the step of playing the further feature game comprises the steps of operating a sequence of second selectors, and selecting an outcome for a second selector in the sequence.

17. A method in accordance with claim 16, wherein at least one outcome of each second selector in the sequence of second selectors is a sequence continue outcome; and wherein if a sequence continue outcome is achieved, the method comprises the step of playing the next second selector in the sequence.

18. A method in accordance with claim 16, comprising the step of displaying a representation of each of the second selectors in the sequence of further selectors.

19. A method in accordance with claim 18, wherein if a further selector in the sequence is not played, a representation of the further selector is not displayed.

20. A method in accordance with claim 18, wherein the representation of each second selector of the sequence comprises a display of a die, the outcome indicating parts of each second selector being represented by faces of the respective die.

21. A method in accordance with claim 20, comprising the step of controlling the display to represent each die in the sequence to show a face which represents the second selector outcome.

22. A method in accordance with claim 13 and further including awarding a prize dependent upon the number of second selectors in the sequence that are played.

23. A method in accordance with of claim 13, wherein the first game is a wheel game and each of the outcome indicating parts is represented as a segment of a wheel.

24. A method in accordance with claim 23, wherein the first game is generated as an outcome of a base game.

25. A method in accordance with claim 24, wherein the base game is a reel game.

26. A method in accordance with claim 13, wherein the step of playing the further feature game comprises playing a reel game and selecting one or more symbols from a plurality of available symbols.

27. A method in accordance with claim 26, wherein the step of playing the reel game, comprises the step of holding one or more reels and spinning a remaining one or more reels.

28. A method in accordance with claim 13, wherein the step of playing the further feature game comprises playing a game by controlling selection of a plurality of symbols from a set of symbols.

29. A method in accordance with claim 13, comprising the further step of selecting a multiplier; and multiplying an outcome of the further feature game by the multiplier to determine the prize.

30. A game controller for a gaming system, the game controller being arranged to control operation of a base game from which is triggered a first game having a plurality of available game outcomes, and control operation of a display to display a representation of play of the first game, the representation comprising a first selector having a plurality of outcome indicating parts and at least one blank indicating part and an indicator, the game controller being arranged to determine a first game outcome for the first game from the plurality of available game outcomes, and to control the selector to indicate the outcome indicating part or the blank indicating part associated with the first game outcome; and wherein at least one of the available first game outcomes being a further feature game, the game controller being arranged to control play of the further feature game to determine a prize to be awarded, the further feature game being different to the base game and comprising a plurality of second selectors that are initiated in sequence, wherein at least one outcome of a second selector is a sequence continue outcome, and wherein the next in sequence of the second selectors is only initiated when said sequence continue outcome occurs; and wherein at least one other of the available first game outcomes is a game ending outcome in which the selector indicates the at least one blank indicating part, and ending the first game in response to the game ending outcome.

31. A game controller in accordance with claim 30, wherein at least one of the available outcomes of a second selector determines a prize to be awarded.

32. A game controller in accordance with claim 31, wherein the game controller is arranged to control the display to display a representation of the further feature game, the representation comprising the plurality of second selectors, each of the second selectors having a plurality of outcome indicating parts indicating the available further selector outcomes.

33. A game controller in accordance with claim 32, wherein the representation of the second selector is of a die, and wherein the plurality of outcome indicating parts of the second selectors are represented by faces of the die.

34. A game controller in accordance with claim 31, wherein the prize to be awarded depends upon the number of second selectors in the sequence that are played.

35. A game controller in accordance with claim 30, wherein the game controller is arranged to control the display to display a representation of each of the second selectors in the sequence of second selectors.

36. A game controller in accordance with claim 35, wherein if a second selector in the sequence is not played, a representation of that second selector is not displayed.

37. A game controller in accordance with claim 35, wherein the representation of each second selector of the sequence comprises a display of a die, the outcome indicating parts of each further selector being represented by faces of the respective die.

38. A game controller in accordance with claim 37, wherein the game controller is arranged to control the display to represent each die in the sequence to show a face which represents the second selector outcome determined by the game controller for each second selector in the sequence.

39. A game controller in accordance with claim 30, wherein the first game is a wheel game and each of the outcome indicating parts is represented as a segment of a wheel.

40. A game controller in accordance with claim 30, wherein the first game is generated as an outcome of a base game.

41. A game controller in accordance with claim 30, wherein the base game is a reel game.

42. A game controller in accordance with claim 30, wherein the game controller is arranged to control play of a reel game to implement the further feature game, and to select one or more symbols from a plurality of available symbols.

43. A game controller in accordance with claim 42, wherein there are a plurality of reels and one or more of the reels are held and the other reels spun.

44. A game controller in accordance with claim 30, wherein the game controller is arranged to determine a multiplier for multiplication of a prize outcome of the further feature game.

* * * * *

UNITED STATES PATENT AND TRADEMARK OFFICE

CERTIFICATE OF CORRECTION

PATENT NO. : 8,662,987 B2
APPLICATION NO. : 12/368183
DATED : March 4, 2014
INVENTOR(S) : Bennett et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 828 days.

Signed and Sealed this
Twenty-first Day of July, 2015

Michelle K. Lee

Michelle K. Lee
*Director of the United States Patent and Trademark Office*